June 3, 1930. H. P. DAHLSTRAND 1,762,117
ADJUSTING MECHANISM
Filed May 31, 1928

Inventor
H. P. Dahlstrand by
Attorney

Patented June 3, 1930

1,762,117

UNITED STATES PATENT OFFICE

HANS P. DAHLSTRAND, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

ADJUSTING MECHANISM

Application filed May 31, 1923. Serial No. 281,993.

The present invention relates in general to improvements in the construction and operation of adjusting mechanisms, and relates more specifically to improvements in devices for effecting axial adjustment of a shaft or rotor in order to establish accurate clearances between the rotary element and an adjacent member.

An object of the invention is to provide an improved adjusting mechanism for effecting axial adjustment within predetermined limits, of a rotary element such as a shaft. Another object of the invention is to provide simple and effective means for effecting variation in the clearances between a rotary element and its enclosing housing, from the exterior of the housing. A further object of the invention is to provide improved instrumentalities for effecting simultaneous axial adjustment of a shaft and of a thrust bearing associated therewith, and for definitely limiting the adjusting motion. Still another object of the invention is to provide a conveniently manipulable limit stop cooperating with the clearance adjusting mechanism of a steam turbine or the like, whereby the rotor clearance may be accurately determined from the exterior of the turbine casing. These and other objects of the invention will be apparent from the following description.

A clear conception of an embodiment of the invention and of the mode of constructing and of manipulating clearance adjusting mechanisms built in accordance therewith, may be had by referring to the drawing accompanying and forming a part of this specification in which like reference characters designate the same or similar parts in the various views.

Figure 1:
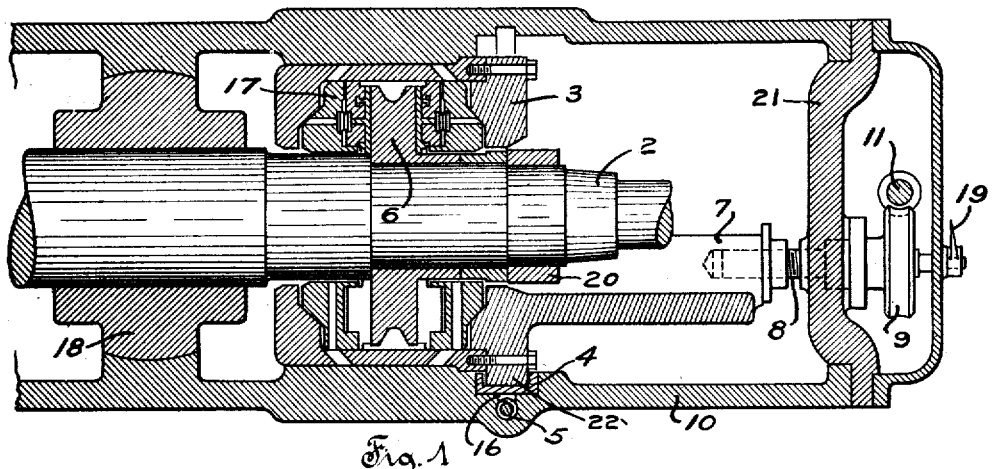
Fig. 1 is a fragmentary longitudinal vertical section through a combined thrust and guide bearing for a shaft, and through the mechanism for effecting axial adjustment of the shaft.
Figure 2:
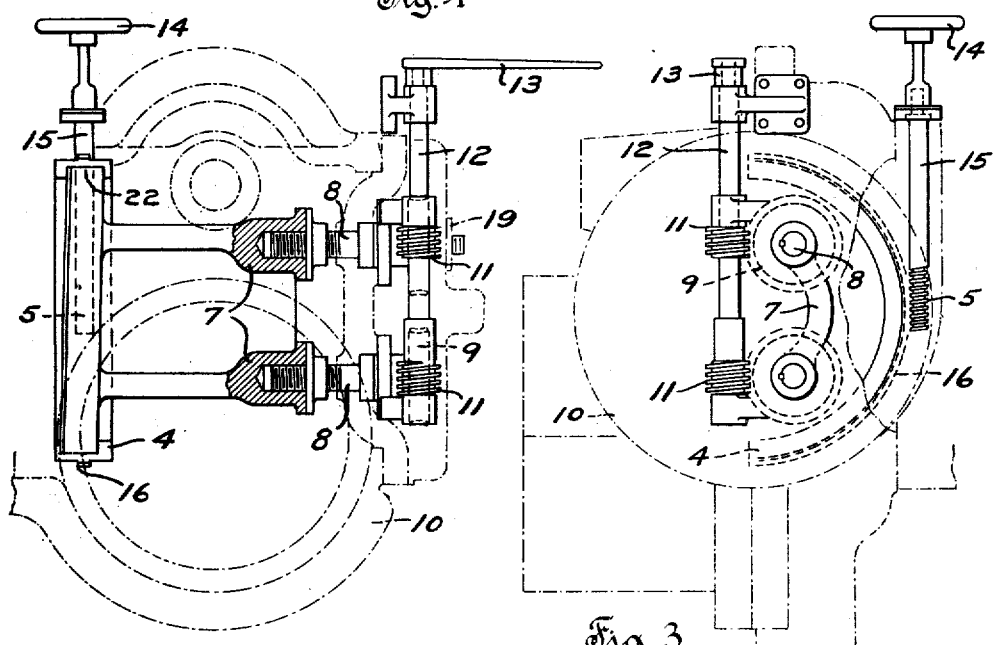
Fig. 2 is a part sectional bottom view of the improved shaft adjusting mechanism.
Figure 3:
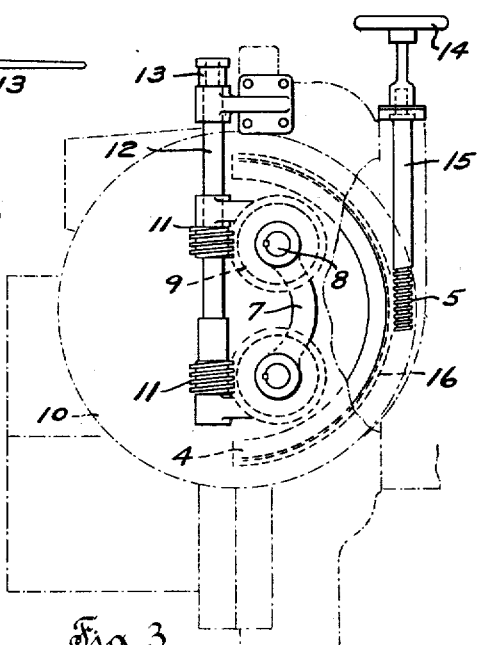
Fig. 3 is a somewhat diagrammatic end view of the improved shaft adjusting mechanism.

The improved bearing structure shown in detail in the drawing, comprises in general a stationary member or main casing 10; a movable member or auxiliary casing 3 slidably confined within the main casing 10; a main shaft 2 extending centrally through the auxiliary casing 3; a thrust bearing between the shaft 2 and the casing 3 and comprising a flange 6 rigidly attached to the shaft 2 by means of a clamping nut 20, and bearing shoes 17 coacting with the flange 6 and with the auxiliary casing 3; and a guide bearing 18 cooperating with the shaft 2 and confined within the main casing 10 adjacent to one end of the casing 3.

The thrust bearing is of well known construction and is adapted to normally prevent axial displacement of the main shaft 2 within the main casing 10. The auxiliary casing 3 is provided along the lower portion of one end thereof, with an outwardly projecting curved flange 22 which is slightly inclined relative to a plane extending perpendicular to the shaft axis. This inclined flange is disposed within a recess formed in a rotary curved wedge 4 which is in turn fitted within a groove in the main casing 10. The wedge recess is formed to provide considerable clearance for endwise adjustment of the flange 22. The curved wedge 4 forms a limit stop for the clearance adjuster, and is provided with teeth 16 which mesh with a worm 5 carried by a shaft 15. The shaft 15 is rotatably mounted in the main casing 10 and the end of this shaft which extends beyond the exterior of the casing 10, is provided with a hand wheel 14.

The flanged end of the auxiliary casing 3 is provided with a rearward extension 7 having threaded end sockets therein. A pair of parallel screw threaded rods 8 are rotatably mounted in an end cap 21 secured to the casing 10, and have screw threaded coaction with the sockets of the extension 7. Each of the rods 8 carries a worm wheel 9 and these worm wheels cooperate with worms 11 secured to the clearance adjusting shaft 12. The clearance adjusting shaft 12 is rotatably supported in the end plate 21 and may be rotated to effect axial adjustment of the shaft 2, by means of a lever 13.

The bearing structure is especially applicable to steam turbine structures wherein a rotor is carried by the shaft 2 and this rotor cooperates through predetermined clearances, with the turbine casing. When thus employed, the improved device permits relative adjustment of the rotor and casing, at any time after the machine has been assembled. The improved mechanism also permits such relative adjustment of the rotor and casing, from the exterior of the unit and without dismantling any parts thereof.

When it becomes desirable to longitudinally adjust the shaft 2, the lever 13 may be manipulated to cause the gears 9, 11 and the threaded rods 8 to gradually shift the inner casing 3 and the elements coacting therewith including the shaft 2, along the outer casing 10, within the limits of the groove of the wedge 4. By virtue of the clearance provided between the sides of the wedge groove and the flange 22, the wedge 4 forms a limit stop which positively prevents further axial adjustment of the shaft 2 when the flange 22 engages a side surface of the wedge recess, unless the wedge is withdrawn by manipulation of the hand wheel 14. When the hand wheel 14 is manipulated, the wedge 4 is shifted about the shaft axis, thereby advancing the limit stop surfaces axially of the shaft in either direction.

During such axial adjustment of the shaft 2, it slides within the guide bearing 18, and the relative position of the thrust bearing parts is not interfered with as the thrust bearing moves bodily along with the shaft. When the desired degree of adjustment has been attained, the worm gearing 9, 11 firmly locks the shaft 2, the thrust bearing and the casing 3 in position. An indicating device 19 associated with one of the shafts 8, serves to determine the degree and the final position of adjustment of the parts.

It will thus be noted that the improvement provides means for rapidly and effectively moving the shaft 2 and the associated parts longitudinally of the shaft axis, from the exterior of the main casing 10. Such adjustment may be accomplished without disturbing the thrust bearing and the elements may be effectively maintained in position after adjustment. The rotary wedge 4 constitutes simple means for varying the limits of adjustment of the parts in opposite direction, and this wedge is readily manipulable to so adjust the limit stops by means of the hand wheel 14. The wedge clearance may be made any desired amount, depending upon the rotor clearances required.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a stationary member, a movable member supported by said stationary member, a shaft extending in proximity to said movable member, a thrust bearing between said shaft and said movable member, means for axially moving said shaft, and a single curved wedge for simultaneously limiting the movement of said shaft and of said bearing and of said movable member along said stationary member in either of two directions.

2. In combination, a stationary member, a movable member slidably supported by said stationary member, a shaft extending in proximity to said movable member, a thrust bearing between said shaft and said movable member, means for axially moving said shaft and bearing, and a single rotary wedge for simultaneously limiting the movement of said shaft and of said bearing and of said movable member along said stationary member longitudinally of the shaft axis in either direction.

3. In combination, a stationary casing, a movable casing housed within said stationary casing, a shaft extending into said movable casing, a thrust bearing between said shaft and said movable casing, means for axially moving said shaft and said bearing and said movable casing, and a single curved wedge operable from the exterior of said stationary casing for simultaneously limiting the movement of said shaft and of said bearing and of said movable casing longitudinally of said shaft in either direction.

4. In combination, a stationary casing, a movable casing housed within said stationary casing, a shaft extending through said movable casing, a thrust bearing housed within said movable casing and cooperating with said shaft and with said movable casing, means for shifting said movable casing axially of said shaft, and a single wedge rotatable within said stationary casing from the exterior thereof for simultaneously limiting the movement of said shaft and of said movable casing along the axis of said shaft in either direction.

5. In combination, a stationary casing, a movable casing located within said stationary casing, a shaft having a thrust bearing located within said movable casing, a single rotary wedge for simultaneously limiting the movement of said shaft and of said bearing and of said movable casing along the shaft axis in either direction, and means associated with said stationary casing for axially shifting said shaft and for locking the same in adjusted position.

6. In combination, a movable casing having a peripheral flange, a shaft having a thrust bearing within and cooperating with said casing, and a wedge having a recess the sides of which are cooperable through clearance with the opposite sides of said flange to simultaneously limit the movement of said casing and of said bearing and of said shaft longitudinally of the shaft axis in either direction.

7. In combination, a stationary casing, a movable casing housed within said stationary casing, a shaft extending into said movable casing, a thrust bearing between said shaft and said movable casing, means for axially moving said shaft and said bearing and said movable casing, a single curved wedge for simultaneously limiting the movement of said shaft and of said bearing and of said movable casing longitudinally of said shaft, and means operable from the exterior of said stationary casing for manipulating said wedge.

8. In combination, a stationary casing, a movable casing located within said stationary casing, a shaft having a thrust bearing located within said movable casing, a rotary wedge for simultaneously limiting the movement of said shaft and of said bearing and of said movable casing along the shaft axis, and means operable from the exterior of said stationary casing for rotating said wedge.

9. In combination, a movable casing having a flange extending outwardly therefrom, a shaft having a thrust bearing within and cooperating with said casing, a wedge having a recess the sides of which are cooperable through clearance with the opposite sides of said flange to simultaneously limit the movement of said casing and of said bearing and of said shaft longitudinally of the shaft axis, and means cooperating with said wedge for moving the same and for locking said wedge in adjusted position.

10. In combination, a stationary casing, a movable casing within said stationary casing and having a peripheral flange, a shaft having a thrust bearing within and cooperating with said movable casing, and a rotary wedge slidable within a recess in said stationary casing and cooperable with the opposite sides of said flange to simultaneously limit the movement of said movable casing and of said bearing and of said shaft longitudinally of the shaft axis in either direction.

In testimony whereof, the signature of the inventor is affixed hereto.

HANS P. DAHLSTRAND.